Patented Apr. 11, 1944

2,346,272

UNITED STATES PATENT OFFICE 2,346,272

PREPARATION OF ESTERS

Benjamin Pecherer, Detroit, Mich.

No Drawing. Application October 6, 1941,
Serial No. 413,830

16 Claims. (Cl. 260—468)

My invention is concerned with the preparation of esters from primary nitro compounds and is particularly concerned with a novel and highly useful method, simple in operation and productive of good yields.

I have discovered that primary nitro compounds, particularly nitrohydrocarbons and especially nitroparaffins, may be reacted with alcohols in the presence of a strong acid to produce esters. The nitro compounds may contain one or more primary nitro groups, but at least most of the said compounds may be represented by the general compact formula

R—CH$_2$—NO$_2$ wherein R is an organic radical undergoing no change in the reaction. The by-product of the reaction is the hydroxylamine salt of the acid used in the reaction, the desired ester being removed from the reaction mixture in any suitable manner as, for example, by distillation or extraction. For each mol of primary nitro compound employed, one mol of hydroxylamine, in the form of a salt, is produced. The reaction involved may be represented by the following overall equation, utilizing a mono primary nitro compound as one of the reactants:

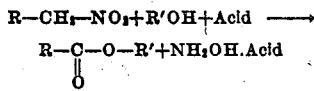

The following examples are illustrative of the practice of the present invention. It will be appreciated that the proportions of reacting ingredients, times of reaction, order of steps, and temperatures may be varied and that supplementary processes of purification and the like may be resorted to wherever found desirable, necessary, or convenient. These and other variations and modifications will be evident to those skilled in the art in the light of the guiding principles which are disclosed herein.

EXAMPLE I.—*Preparation of methyl formate*

16 grams of methyl alcohol (0.5 mol), 30.5 grams of nitromethane (0.5 mol), and 50 grams of 100% sulphuric acid were refluxed for 3 hours. A short time after refluxing started, the mixture separated into two liquid phases, an upper colorless phase and a lower dark-colored phase. The initial boiling point of the mixture was about 90 degrees C. and at the end of the refluxing period the boiling point had dropped to about 75 degrees C. The reaction mixture was cooled and then transferred to a distilling flask and distilled, 25 grams of material, boiling up to 40 degrees C., being collected. The distillate consisted essentially of methyl formate.

EXAMPLE II.—*Preparation of isopropyl acetate*

25 grams of nitroethane (⅓ mol), 20 grams of isopropyl alcohol (⅓ mol), and 35 grams of 95% sulphuric acid were refluxed for 3 hours, the boiling point during the refluxing period being from 95 degrees C. to 110 degrees C. The reaction mixture was then distilled and the fraction boiling between 90 degrees C. and 100 degrees C. was collected as crude isopropyl acetate. The weight of the crude ester was 25 grams. It was then dried over anhydrous calcium chloride.

EXAMPLE III.—*Preparation of n-butyl propionate*

30 grams of 1-nitropropane (0.342 mol) and 40 grams of 100% sulphuric acid were refluxed together for one hour. The mixture was then cooled and 25 grams of n-butyl alcohol (0.337 mol) were carefully added while maintaining the mixture at relatively low temperatures in a cold water bath. After thorough agitation of the reaction mixture, the same was refluxed for another two hours during which time the boiling point rose from about 120 degrees C. to about 150 degrees C. Shortly after the addition of the n-butyl alcohol, a second liquid phase appeared. At the end of the refluxing period, the mixture was cooled and the two layers which had formed were separated in a separatory funnel. To the lower dark-colored layer there was added five times its volume of isopropyl alcohol whereupon hydroxylamine sulphate separated out in the form of coarse white crystals. The latter were filtered off, washed with a little ether, and dried; the yield of the dry material being 43 grams, indicating a conversion of 96%.

The upper layer was then distilled, yielding 43 grams of a fraction boiling between 135 degrees C. and 145 degrees C. A slight odor of sulphur dioxide was present, indicating that some sulphuric acid had apparently caused a slight decomposition during distillation. The addition of a few grams of anhydrous sodium carbonate readily removed this odor in a short time, leaving only the characteristic fruity odor of n-butyl propionate. The material was re-distilled, yielding 41.5 grams of a product boiling at 142 degrees C. to 145 degrees C. The yield was 95%, based on the input, and 97.6%, based upon conversion of the 1-nitropropane to hydroxylamine.

The primary nitro compounds which may be reacted in accordance with my present invention to produce esters may be selected from an extensive group, representative examples being nitromethane; nitroethane; 1,2 dinitroethane; 1-nitropropane; 1-nitrobutane; 1-nitropentane; dinitroneopentane; alkyl, cycloalkyl, aryl and aralkyl substituted primary nitrohydrocarbons such as amylnitromethane, cyclohexyl nitromethane, phenyl nitromethane, benzyl nitromethane, 1-nitro-2 cyclohexyl-ethane and the like. I may also employ other substituted primary nitrohydrocarbons or nitroparaffins such as the hydroxy substitution products. These hydroxy primary nitrohydrocarbons, which may be obtained, for example, by condensing nitromethane with a substantially equi-molar quantity of an aldehyde or ketone, produce esters of hydroxy acids in accordance with my invention. Typical examples of such hydroxy primary nitrohydrocarbons are the following:

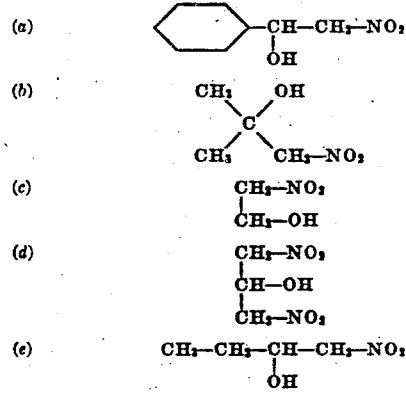

Mandelic esters may, for example, be prepared from 1-phenyl-2-nitro-1-ethanol

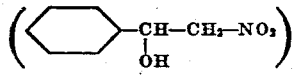

and hydroxy isobutyric acid esters may be prepared from 1,1 dimethyl-1-hydroxy-2-nitroethane $((CH_3)_2=C(OH)-CH_2-NO_2)$. By dehydrating the hydroxy-isobutyric acid esters, methyl acrylic acid esters result which are useful for the preparation of acrylate resins.

The alcohols which are utilized in the preparation of the esters may be of aliphatic, cycloaliphatic, aromatic or aromatic-aliphatic character, of higher or lower molecular weight. Representative examples are methyl alcohol, ethyl alcohol, propyl alcohol, isopropyl alcohol, butyl and isobuty alcohols, amyl alcohols, hexyl alcohol, 2-ethyl hexanol, 2-butyl octanol, cyclohexanol, octyl alcohol, lauryl alcohol, cetyl alcohol, benzyl alcohol; glycerol; glycols such as ethylene glycol, diethylene glycol, propylene glycol, triethylene glycol, and the like; alcohols in the form of ether derivatives of glycols such as the mono-ethers of the various glycols mentioned, and others, with methyl, ethyl, propyl and butyl alcohols; cresols, naphthols, xylenols, and the like. It will be understood that any of these alcohols, or mixtures of any two or more thereof, may be reacted with any of the aforementioned or other primary nitro compounds, or mixtures of any two or more thereof, in accordance with my invention. The method is especially satisfactory in connection with the use of the alcohols containing from one to four carbon atoms, such as methyl alcohol, ethyl alcohol, propyl and isopropyl alcohols and the butyl alcohols, where the esters obtained are the low boiling type as, for example, methyl formate, ethyl formate, ethyl acetate, and the like.

The strong acids which I employ in the process of my invention may be of inorganic or organic character, representative examples being hydrochloric acid, nitric acid, sulphuric acid, orthophosphoric acid, metaphosphoric acid, pyrophosphoric acid, tetraphosphoric acid; sulphonic acids such as benzene sulphonic acid, ethyl sulphonic acid; alpha halogeno-carboxylic acids such as monochloraectic acid, dichloracetic acid, trichloracetic acid, the corresponding brom acids, and the like. By the term "strong acid", as used herein, I mean an acid whose dissociation constant is greater than $10^{-2}$. While the particular acid selected may depend, in part, upon the specific character of the alcohol used in the reaction and upon the nature of the ester being prepared, I prefer particularly to employ concentrated sulphuric acid.

As I have pointed out hereinabove, the process of my invention may be utilized to prepare esters from primary nitro compounds containing a plurality of primary nitro groups. Thus, for example, 1,2 dinitroethane furnishes esters of oxalic acid. Dinitroneopentane furnishes esters of dimethyl malonic acid. The 2,2 disubstituted 1,3 dinitropropanes furnish disubstituted malonic acid esters which are valuable intermediates for the production of barbituric acid derivatives which latter substances are, at present, made by more indirect procedures.

Where the primary nitro compounds contain an hydroxyl group or groups, care must be exercised, both with respect to the acid employed and the conditions under which the esterification reaction with the alcohol is carried out, so that reaction does not take place at the hydroxyl group or groups. It may be advisable, at least in certain of said cases, to use hydrochloric acid or acids other than sulphuric and phosphoric acids in the reaction.

The manner in which the reaction may be carried out may be varied, as I have pointed out hereinabove. Thus, for example, the primary nitro compound, the alcohol, and the acid may be refluxed together for a suitable length of time and the resulting reaction mixture worked up to recover the ester. Alternatively, for those esters whose boiling points lie below the boiling points of the primary nitro compound and the alcohol, a mixture of the theoretical quantities of the primary nitro compound and alcohol to form the ester may be added to a refluxing mixture of the acid and a small amount of the primary nitro compound and the alcohol. Under these conditions, the ester distills out continuously from the reaction mixture. The acid essential for the initial conversion may be added continuously or intermittently. Where the esters produced have boiling points above the boiling points of the primary nitro compound and alcohol, a mixture of the primary nitro compound and the alcohol may be added continuously to the refluxing mixture. Suitable fractions of the boiling vapors may then be taken off at the proper point in a fractionating column above the refluxing mixture and returned to the reaction vessel.

The esterification reaction may be carried out either as a batch process or as a continuous process. In connection with the preparation of those esters whose boiling points are higher than the boiling points of the reactants, selected portions of the distillate may be returned to the original system after suitable isolation of desired fractions.

Where the boiling point of the ester produced lies below the boiling point of the initial reactants, the ester may be continuously distilled out of the reaction mixture.

In general, the reactions are carried out at refluxing temperatures of the reaction mixtures at atmospheric pressures. Where certain acids are employed, for example, sulphuric acid, care must be exercised that too high reaction temperatures are not utilized since decomposition may result. As a general rule, temperatures above 175 degrees C. should be avoided where sulphuric acid is employed and should, preferably, be lower. On the other hand, where acids such as benzene sulphonic acid are utilized, the reaction temperatures may, generally speaking, be materially higher as, for example, as high as about 250 degrees C. In this same general connection, it will be appreciated that the temperatures and times of the reactions, as well as the yields of desired esters, will be influenced by whether the reactions are carried out at atmospheric, subatmospheric or superatmospheric pressures, it being understood that such conditions of carrying out the process are within the scope of my invention.

In the light of the above examples, it will be seen that the reaction is essentially a non-aqueous one. Water may be present in small proportions. The use of strong acids in high concentration, devoid or substantially devoid of water, enables the reaction to be carried out rapidly. The process, moreover, possesses the additional advantage that the reaction is irreversible.

Wherever the term "lower molecular weight alcohol" is employed herein, it will be understood to mean an alcohol containing not more than six carbon atoms unless the connotation expressly indicates otherwise.

What I claim as new and desire to protect by Letters Patent of the United States is:

1. A method of preparing esters which comprises reacting a compound corresponding to the formula

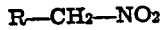

wherein R is an organic radical undergoing no change, with an alcohol in the presence of a strong acid.

2. A method of preparing low boiling esters, which comprises reacting a compound corresponding to the formula

wherein R is an aliphatic hydrocarbon radical undergoing no change, with a lower molecular weight aliphatic alcohol in the presence of a strong acid.

3. A method of preparing low boiling esters which comprises reacting a compound corresponding to the formula

wherein R is an organic radial undergoing no change, with a lower molecular weight alcohol in the presence of a strong acid.

4. A method of preparing esters from primary nitro-hydrocarbons which comprises reacting a primary nitro-hydrocarbon with an alcohol in the presence of a strong acid.

5. A method of preparing esters from mono primary nitro-hydrocarbons which comprises reacting a mono primary nitro-hydrocarbon with an alcohol in the presence of a strong acid.

6. A method of preparing esters from mono primary nitro-hydrocarbons which comprises reacting a mono primary nitro-hydrocarbon with a lower molecular weight aliphatic alcohol in the presence of sulphuric acid.

7. In a method of preparing low boiling esters from primary nitroparaffins, the steps which include heating together a primary nitroparaffin with a lower molecular weight alcohol in the presence of a strong acid, and separating the low boiling esters from the reaction mixture.

8. In a continuous method of preparing low boiling esters from mono primary nitroparaffins, the steps which include heating together a mono primary nitroparaffin with an aliphatic alcohol containing not more than four carbon atoms, in the presence of sulphuric acid, and separating the low boiling esters from the reaction mixture.

9. In a continuous method of preparing methyl and ethyl esters from primary nitroparaffins, the steps which include heating together a primary nitroparaffin with a member selected from the group consisting of methyl and ethyl alcohols, in the presence of a strong acid, and separating the esters from the reaction mixture.

10. In a continuous method of preparing methyl and ethyl esters from mono primary nitroparaffins, the steps which include heating together a mono primary nitroparaffin with a member selected from the group consisting of methyl and ethyl alcohols, in the presence of sulphuric acid, and separating the low boiling esters from the reaction mixture.

11. In a method of preparing low boiling esters from nitromethane, the steps which include heating together nitromethane with a lower molecular weight alcohol in the presence of a strong acid, and separating the low boiling esters from the reaction mixture.

12. In a method of preparing methyl and ethyl esters of formic acid, the steps which include heating nitromethane with a member selected from the group consisting of methyl and ethyl alcohols, said reaction being carried out in the presence of a strong acid.

13. In a method of preparing methyl and ethyl esters of formic acid, the steps which include refluxing nitromethane with a member selected from the group consisting of methyl and ethyl alcohols, said reaction being carried out in the presence of sulphuric acid.

14. In a method of preparing esters of acetic acid, the steps which include heating nitroethane with a lower molecular weight alcohol, said reaction being carried out in the presence of a strong acid.

15. In a method of preparing methyl and ethyl esters of acetic acid, the steps which include heating nitroethane with a member selected from the group consisting of methyl and ethyl alcohols, said reaction being carried out in the presence of a strong acid.

16. In a method of preparing esters of propionic acid, the steps which include heating 1-nitropropane with a lower molecular weight alcohol, said reaction being carried out in the presence of a strong acid.

BENJAMIN PECHERER.